US007857382B2

(12) United States Patent
Vitito

(10) Patent No.: US 7,857,382 B2

(45) **Date of Patent: *Dec. 28, 2010**

(54) DETACHABLE VEHICLE ENTERTAINMENT SYSTEM FOR THE ARMREST/CONSOLE OF A VEHICLE

(75) Inventor: Christopher J. Vitito, Celebration, FL (US)

(73) Assignee: Audiovox Corporation, Hauppauge, NY (US)

(*) Notice: Subject to any disclaimer, the term of this patent is extended or adjusted under 35 U.S.C. 154(b) by 433 days.

This patent is subject to a terminal disclaimer.

(21) Appl. No.: 11/172,937

(22) Filed: Jul. 5, 2005

(65) Prior Publication Data

US 2006/0258440 A1 Nov. 16, 2006

Related U.S. Application Data

(60) Provisional application No. 60/672,883, filed on Apr. 20, 2005.

(51) Int. Cl.
*A47C 7/72* (2006.01)

(52) U.S. Cl. .............................. 297/217.3; 297/188.16; 297/188.18; 348/837

(58) Field of Classification Search ............ 297/188.14, 297/188.15, 188.16, 188.18, 188.19, 217.3, 297/411.2; 348/837
See application file for complete search history.

(56) References Cited

U.S. PATENT DOCUMENTS 4,690,362 A 9/1987 Hedgeland
5,161,766 A 11/1992 Arima
5,177,616 A * 1/1993 Riday ......................... 348/837
5,179,447 A 1/1993 Lain
5,222,780 A 6/1993 Reh et al.
5,316,369 A 5/1994 Kanda
5,338,081 A * 8/1994 Young et al. ............. 296/37.14
5,374,104 A 12/1994 Moore et al.
5,398,991 A 3/1995 Smith et al.
5,436,792 A 7/1995 Leman et al.
5,544,010 A 8/1996 Schultz et al.
5,667,179 A 9/1997 Rosen
5,751,548 A 5/1998 Hall et al.
5,946,055 A * 8/1999 Rosen ........................ 348/837
6,007,036 A 12/1999 Rosen
6,007,038 A 12/1999 Han
6,023,411 A 2/2000 Howell et al.
6,049,450 A 4/2000 Cho et al.
6,208,508 B1 3/2001 Ruch et al.
6,256,837 B1 7/2001 Lan et al.
6,279,977 B1 8/2001 Chen
6,409,242 B1 6/2002 Chang
6,443,574 B1 9/2002 Howell et al.
6,494,527 B1 12/2002 Bischoff
D469,747 S 2/2003 To et al.

(Continued)

FOREIGN PATENT DOCUMENTS

DE 3927749 2/1991

(Continued)

*Primary Examiner*—Joseph F Edell
(74) *Attorney, Agent, or Firm*—F. Chau & Associates, LLC

(57) ABSTRACT

A vehicle entertainment system includes a video system detachably mounted within an automobile arm rest/console, the armrest/console including an upper support surface. The video system includes an integrated housing supporting a video monitor and a video source.

13 Claims, 4 Drawing Sheets

U.S. PATENT DOCUMENTS 6,522,368 B1 2/2003 Tuccinardi et al.
6,556,435 B1 4/2003 Helot et al.
6,633,347 B2 10/2003 Kitazawa
6,663,155 B1 12/2003 Malone et al.
6,683,786 B2 1/2004 Yin et al.
6,702,238 B1 3/2004 Wang
6,717,798 B2 4/2004 Bell et al.
6,719,343 B2 4/2004 Emerling et al.
6,746,065 B1 * 6/2004 Chan ........................ 296/24.34
6,758,521 B2 7/2004 Imamura et al.
6,890,012 B2 5/2005 Maierholzner
6,899,365 B2 5/2005 Lavelle et al.
D508,900 S * 8/2005 Kawano et al. ............ D14/132
6,926,329 B2 8/2005 Neumann et al.
6,928,654 B2 * 8/2005 Tranchina et al. ............. 725/75
6,945,582 B2 9/2005 Chen
6,997,494 B2 2/2006 Neumann
6,997,508 B2 2/2006 Jaaska, Sr.
7,084,932 B1 8/2006 Mathias et al.
D535,957 S * 1/2007 Vitito ........................ D14/132
7,176,987 B2 * 2/2007 Liu ............................ 348/838
7,261,266 B2 * 8/2007 Satterfield ................ 248/284.1
D551,197 S * 9/2007 Vitito ........................ D14/129
7,399,033 B2 * 7/2008 Hsiao ...................... 297/217.3
7,490,887 B2 * 2/2009 Vitito ........................ 296/37.8
7,604,291 B2 * 10/2009 Vitito .................... 297/188.19
2002/0003875 A1 1/2002 Stewart et al.
2002/0140632 A1 10/2002 Shah
2003/0137584 A1 7/2003 Norvell et al.
2004/0017652 A1 1/2004 Billington et al.
2004/0061995 A1 4/2004 McMahon
2004/0104905 A1 6/2004 Chung et al.
2004/0130616 A1 7/2004 Tseng
2004/0175155 A1 9/2004 Liu
2004/0189797 A1 9/2004 Todd et al.
2004/0227696 A1 11/2004 Schedivy
2004/0237111 A1 11/2004 Iraclianos et al.
2004/0245796 A1 * 12/2004 Maierholzner ............. 296/37.8
2004/0248543 A1 12/2004 Itsukaichi
2005/0053365 A1 3/2005 Adams et al.
2005/0066369 A1 3/2005 Chang
2006/0128303 A1 6/2006 Schedivy
2006/0152026 A1 7/2006 Rist

FOREIGN PATENT DOCUMENTS

JP 05-131879 11/1991
JP 2002533258 A * 10/2002

* cited by examiner 14
18
72
22
36
10
67a
67b
16
24
40
26
54
52
56
64
60
66
30
32
50
28
34
58
17

220
218e
218a
218f
218c
222
218
223
218d

218b

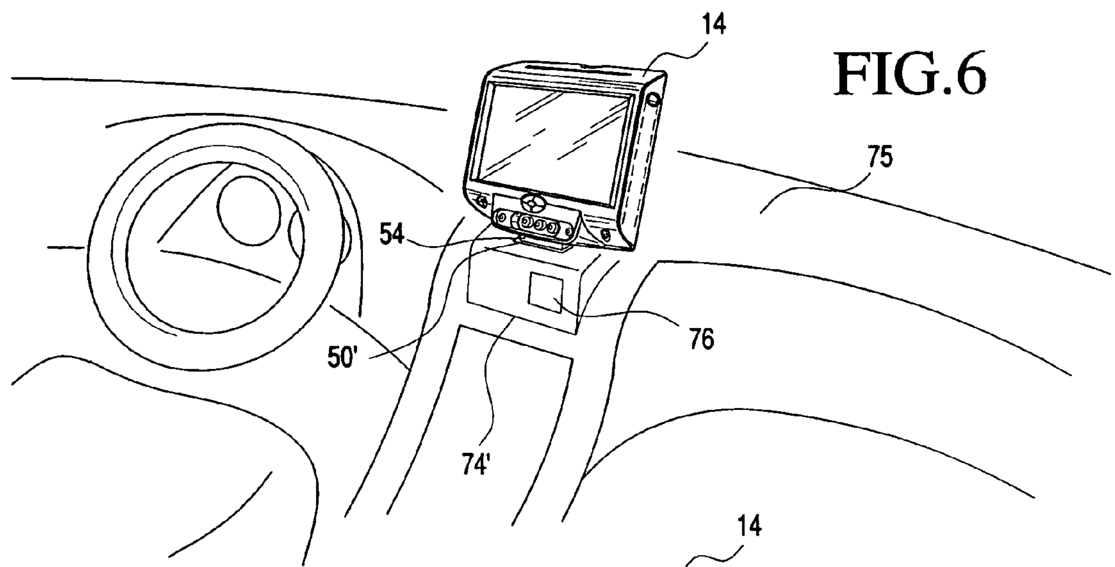
14
FIG.6
75
54
76
50'
74'
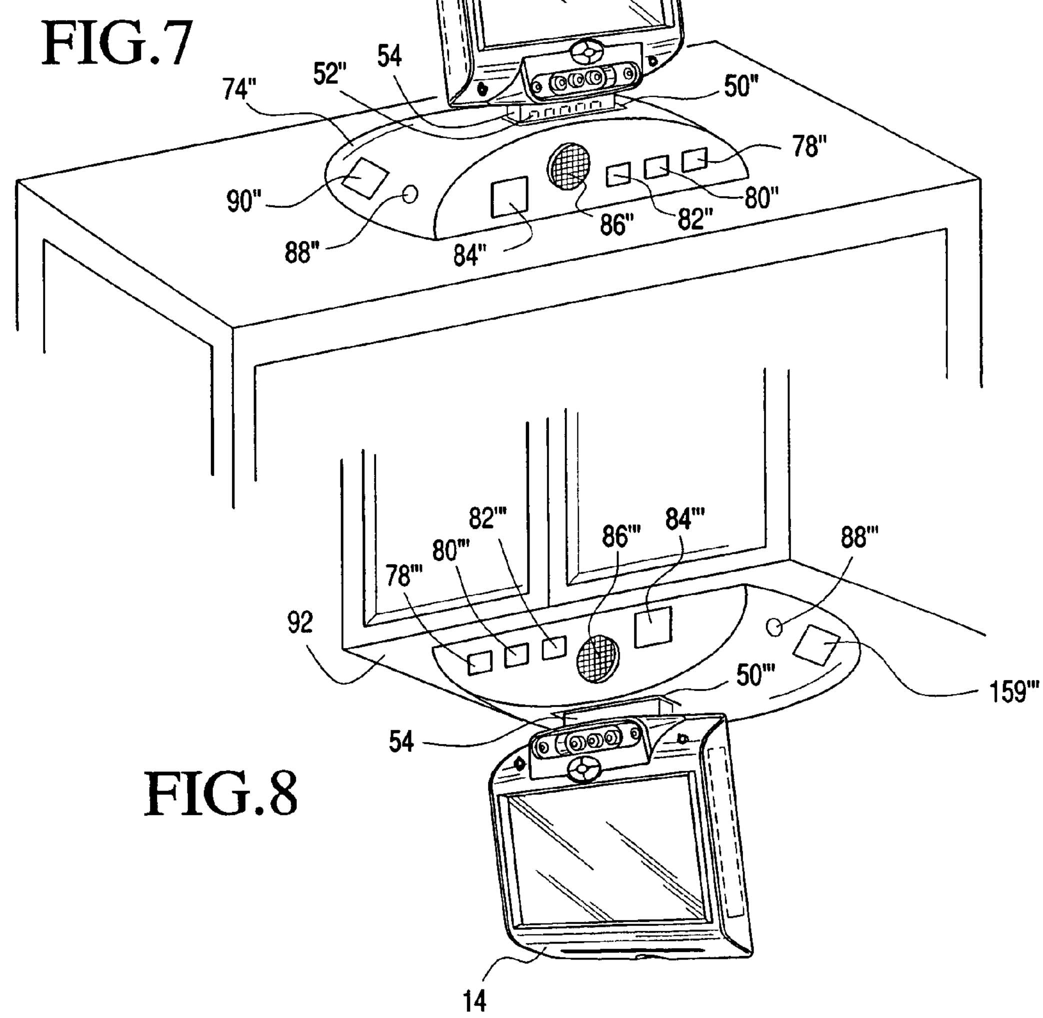
14
FIG.7
54
52"
74"
50"
78"
90"
80"
88"
86"
82"
84"
82'''
80'''
86'''
84'''
88'''
78'''
92
50'''
159'''
54
FIG.8
14

DETACHABLE VEHICLE ENTERTAINMENT SYSTEM FOR THE ARMREST/CONSOLE OF A VEHICLE

CROSS REFERENCE TO RELATED APPLICATIONS

This application is based upon U.S. Patent Application Ser. No. 60/672,883, filed Apr. 20, 2005, entitled "AUTOMOBILE ENTERTAINMENT SYSTEM INCORPORATED WITHIN THE CENTRAL ARMREST/CONSOLE OF AN AUTOMOBILE".

BACKGROUND OF THE INVENTION

1. Field of the Invention

The invention relates to a vehicle entertainment system. More particularly, the invention relates to an entertainment system integrating a video source and video monitor within the central armrest/console of an automobile, wherein the video source and video monitor are detachably secured to the armrest/console of the automobile.

2. Description of the Prior Art

Entertainment systems for automobiles are well known. As such, many advances have been made in the development of entertainment systems that make the otherwise tedious task of riding in an automobile more bearable. In addition to the development of overhead systems pioneered by the present inventor, a variety of systems and techniques for integrating entertainment systems within an automobile have been developed.

For example, headrest entertainment systems have been developed and allow multiple individuals to view a variety of different video sources within the same vehicle. However, some automobiles are not suited for the utilization of headrest entertainment systems and, therefore, are unable to take advantage of this advancement in technology. Similarly, only larger vehicles can take advantage of the overhead systems commonly found in automobiles.

With this in mind, alternate techniques for implementing entertainment systems within automobiles are needed. The present invention attempts to add to the choices consumers have by providing automobile entertainment system that may be integrated within the central armrest/console of an automobile and selectively detached therefrom for use at remote locations.

SUMMARY OF THE INVENTION

It is, therefore, an object of the present invention to provide a vehicle entertainment system including a video system detachably mounted within an automobile armrest/console. The armrest/console includes an upper support surface. The video system includes an integrated housing supporting a video monitor and a video source.

It is also an object of the present invention to provide an entertainment system wherein the video source is a DVD player or hard drive.

It is another object of the present invention to provide an entertainment system wherein the video source is accessed from behind the video monitor.

It is a further object of the present invention to provide an entertainment system wherein the upper support surface is an armrest module and the video system is detachably secured to the armrest module.

It is also an object of the present invention to provide an entertainment system wherein the armrest module is selectively removable from the armrest/console.

It is another object of the present invention to provide an entertainment system wherein the armrest/console includes a cradle shaped and dimensioned for detachably supporting the video system, and the video system includes electrical connectors shaped and dimensioned for selective engagement with electrical connectors formed within the cradle.

It is still another object of the present invention to provide an entertainment system wherein the cradle includes a connecting mechanism for selective attachment of the video system thereto.

It is also another object of the present invention to provide an entertainment system wherein the connecting mechanism includes a release button for selective release of the video system from the cradle.

It is yet a further object of the present invention to provide an entertainment system wherein the connecting mechanism includes a latch member for selective coupling of the video system to the cradle.

It is also an object of the present invention to provide an entertainment system including at least one docking station to which the video system may be selectively secured when not coupled to the armrest/console.

It is also an object of the present invention to provide an armrest/console incorporating vehicle entertainment system including an upper support surface with a video system detachably mounted therein. The video system includes an integrated housing supporting a video monitor and a video source.

Other objects, advantages and salient features of the invention will become apparent from the following detailed description, which taken in conjunction with the annexed drawings, discloses a preferred, but non-limiting, embodiment of the subject invention.

BRIEF DESCRIPTION OF THE DRAWING

FIGS. 6, 7 and 8 show alternate embodiments of docking stations in accordance with the present invention.

DESCRIPTION OF THE PREFERRED EMBODIMENTS

Figure 1:
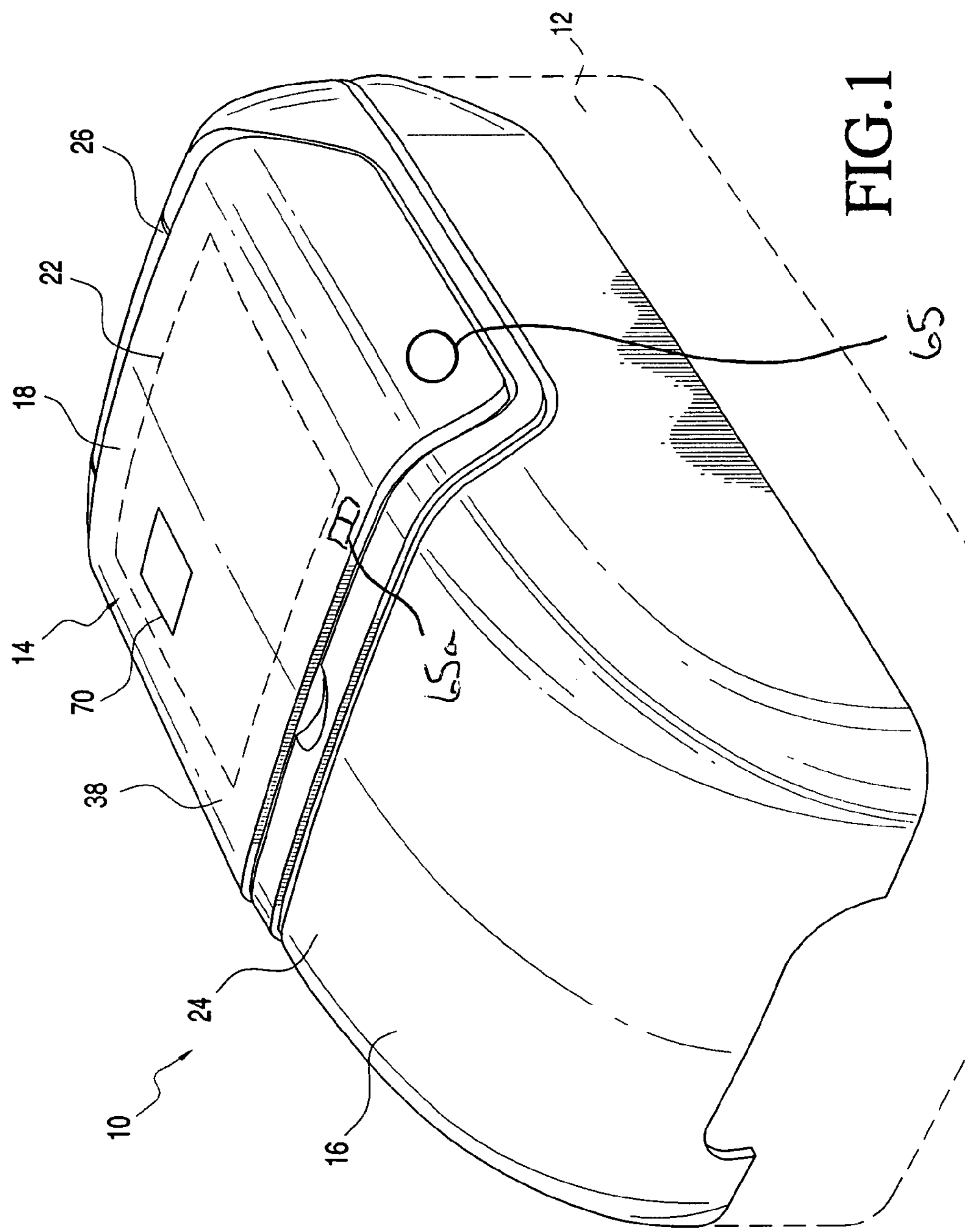
FIG. 1 is a front perspective view of the present automobile entertainment system with the video monitor in its down position.
Figure 2:
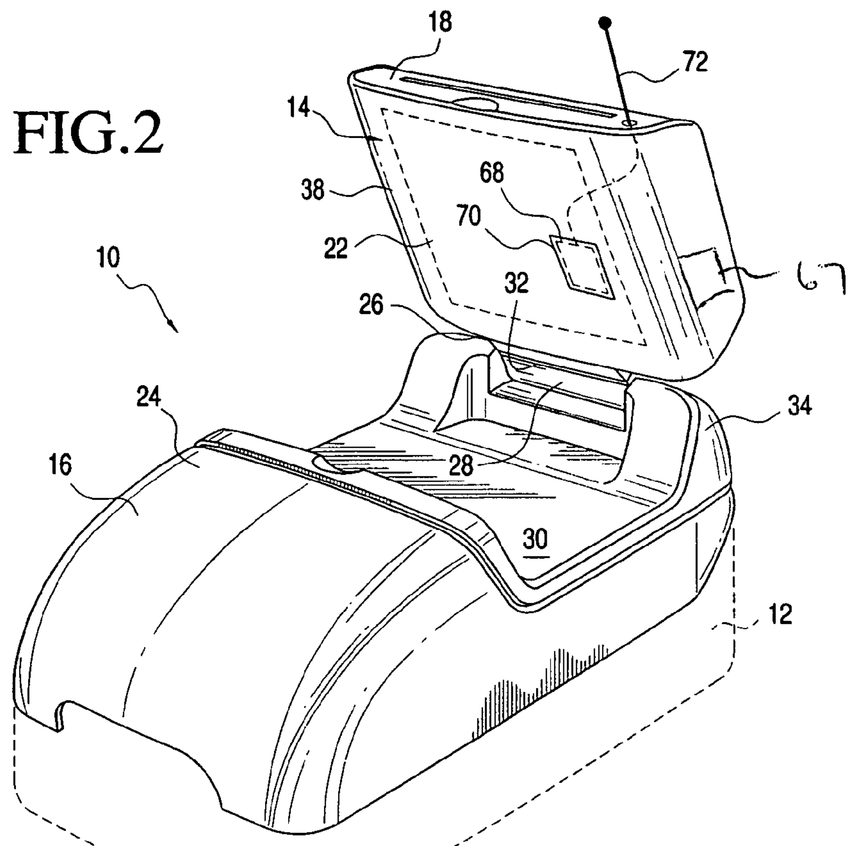
FIG. 2 is a rear perspective view of the present automobile entertainment system with the video monitor in its up position.
Figure 3:
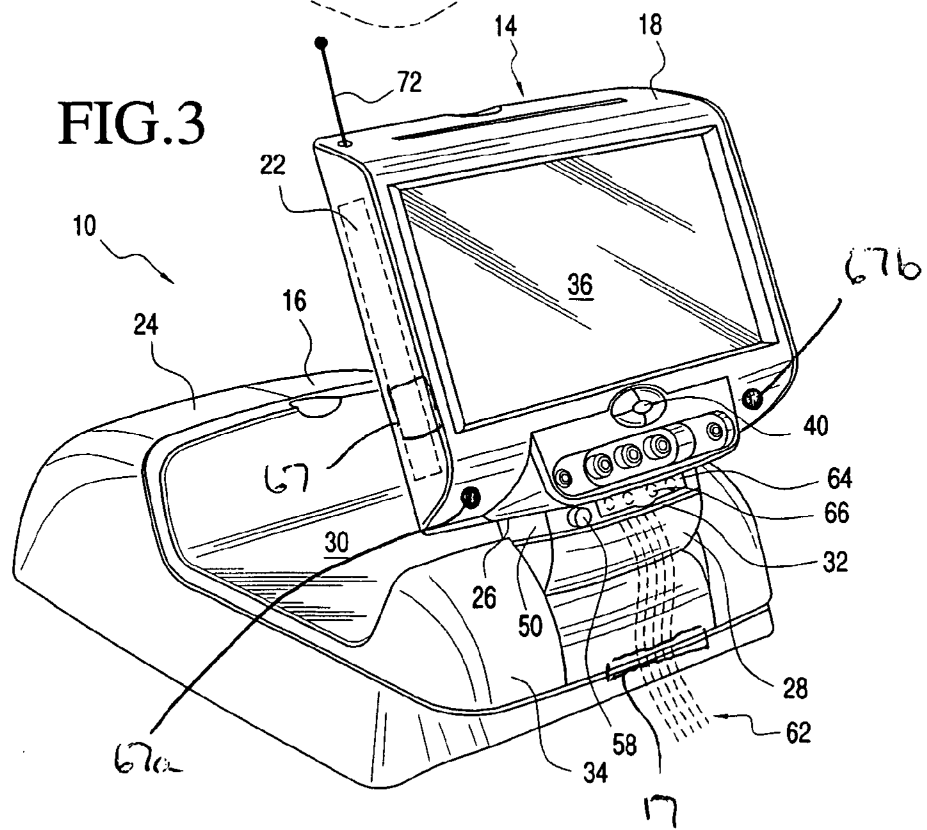
FIG. 3 is a front perspective view of the present automobile entertainment system with the video monitor in its up position.
Figure 4:
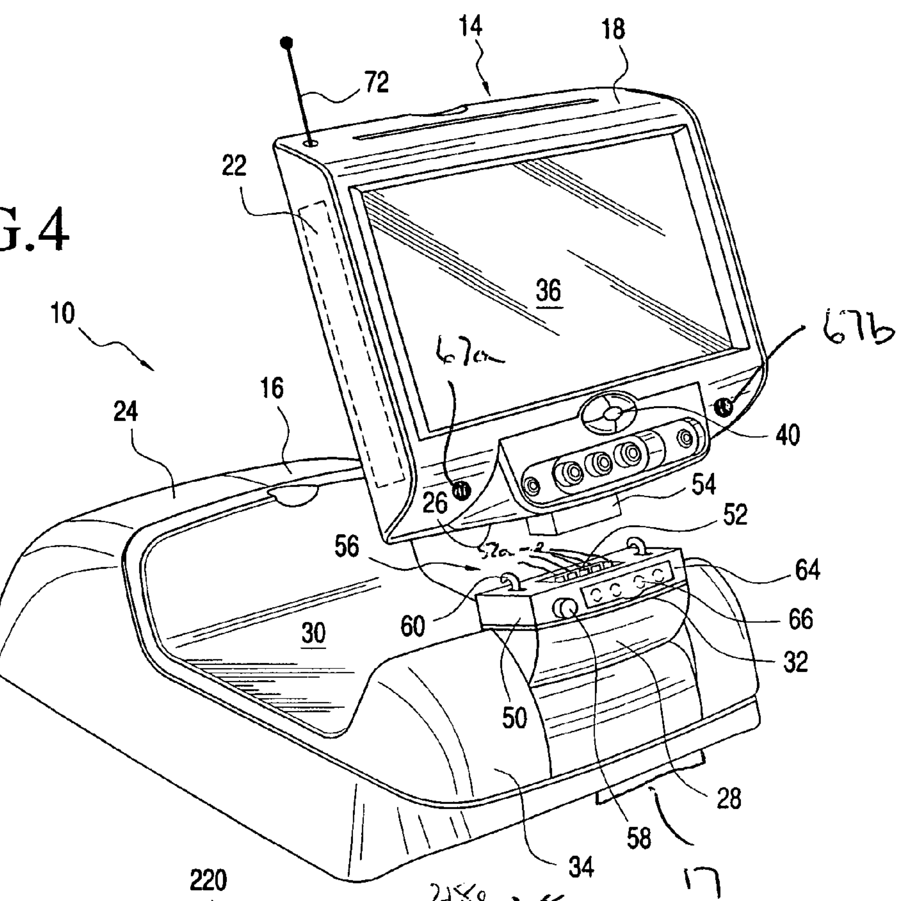
FIG. 4 is a front perspective view of the present automobile entertainment system with the video monitor detached.

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention.

With reference to FIGS. 1, 2, 3 and 4, an automobile entertainment system 10 is disclosed. The automobile entertainment system 10 is composed of a series of video and audio components integrated within an armrest/console 12 of a traditional automobile. Although the present system is described herein for use within an automobile, the system could readily be employed in various vehicles, for example, boats or planes, without departing from the spirit of the present invention. In particular, the entertainment system 10 includes a video system 14 mounted within an armrest module 16 adapted for connection with the central armrest/console 12 of a traditional automobile.

The video system 14 generally includes a housing 18 in which a video monitor 20 and video source 22 are supported. The housing 18, with the video monitor 20 and video source 22, is integrated with the armrest module 16 which functions as both a support for the video monitor 20/video source 22 and the upper support surface 24 of the armrest/console 12. As will be discussed below in greater detail, the video system 14 in detachably secured to the armrest module 16 allowing for use of the video system 14 at various locations. Although the present invention is adapted for use in conjunction with the center armrest/console of a vehicle, the concepts underlying the present invention could readily be applied to other support, storage and/or console type structures (for example, within a door of a vehicle) found within an automobile.

The armrest module 16 is modular in design and is adapted for use with a variety of automobiles by simply changing the appearance and shape of the armrest module 16 so it matches the armrest/console 12. In particular, many automobiles today include an armrest/console with a storage compartment formed therein. The storage compartment is commonly accessed via a hinged upper support surface 24 that is pivoted toward the rear seat of the automobile to expose the contents of the storage cavity formed within the armrest/console 12. It is this upper support surface 24 which is replaced by the present entertainment system 10 for conveniently installing an entertainment system within an automobile. Although the armrest module of the present invention is disclosed in accordance with a preferred embodiment as replacing the upper support surface of a console, those skilled in the art will appreciate that the present armrest module may be configured to function and resemble a complete armrest found in a vehicle.

By employing the present entertainment system 10, a video system 14 may be installed within a variety of vehicles regardless of the ceiling height or headrest dimensions by simply replacing the upper support surface of the factory installed armrest/console with the present entertainment system 10. As those skilled in the art will certainly appreciate, the present armrest module 16 is provided with a hinge structure 17 adapted for ready attachment to the existing structure of the automobile. Further, and as those skilled in the art will also certainly appreciate, the hinge structure may be varied to suit the automobile for which the armrest module is designed.

In addition, and although the present invention is disclosed herein as including a single monitor, it is contemplated the system could be designed with dual monitors for viewing from opposite sides of the vehicle. Such a system could include distinct DVD players associated with each monitor or a single DVD player linked to both monitors.

In accordance with a preferred embodiment of the present invention, the video source 22 is a DVD player coupled to the video monitor 20 for the transmission of video content thereto. That is, the DVD player 22 or other video source is integrated within the same housing 18 as the video monitor 20. It is contemplated that a hard drive 23 video source may also be integrated with the video monitor 16. As those skilled in the art will certainly appreciate, the hard drive 23 will include inputs for receiving video content and outputs for transmitting video content to the video monitor 16, both of which are well known to those skilled in the art. However, and as discussed below in greater detail, the video source may take a variety of forms without departing from the spirit of the present invention; for example, and not limited to, satellite video systems and Bluetooth wireless based systems. In addition, and as discussed below, the video source may be housed at a location separate from the video monitor without departing from the spirit of the present invention.

The video system 14 is pivotally and detachably mounted to the armrest module 16 in a manner permitting storage and retrieval thereof More particularly, the base 26 of the video system 14 is pivotally mounted to a cradle 50 coupled to the armrest module 16 in a manner that permits rotation of the video system 14 about multiple axes. The cradle 50 includes a first hinge 28 that facilitates rotation of the video system 14 from its storage position within a recess 30 formed in the armrest module 16 to an upstanding position for viewing thereof The cradle 50 includes a second hinge 32 that permits rotation of the video system 14 about an axis substantially perpendicular to the axis of the first hinge 28. As such, the second hinge 32 allows for rotation of video system 14 in a manner that facilitates both viewing and protection of the video monitor 20. Although a specific hinge structure is disclosed in accordance with a preferred embodiment, various hinge structures could be employed without departing from the spirit of the present invention.

In particular, the base 26 of the video system 14 is pivotally secured to the armrest module 16 via the cradle 50 at a position adjacent to the rear 34 of the armrest module 16. When the video system 14 is in its storage position within the recess 30 of the armrest module 16, it is oriented with the video screen 36 facing downward and the back 38 of the video system 14 facing upward. As such, the back 38 of the video system 14 functions as part of the armrest/console 12 when the video system 14 is in its storage position.

When one wishes to watch a presentation on the video system 14 from the back seat of the automobile, the video system 14 is lifted from the recess 30 within the armrest module 16, rotated upward about the first axis and then rotated approximately 180 degrees about the second axis such that the video screen 36 faces the backseat of the automobile.

The video monitor 20, DVD player 22 and associated control components are mounted within the housing 18 of the video system 14. In accordance with a preferred embodiment, the video monitor 20 is a TFT LCD screen. However, it is contemplated that other monitor constructions, for example, plasma, Ultra High Definition VGA, touch screen VGA, organic LED, fabric based monitors (e.g., flexible TFT) etc., may be used without departing from the spirit of the present invention.

With regard to the DVD player 22, it is structured as a top slot-loading DVD player known to those skilled in the art. It is integrally molded within the housing 18 and positioned for insertion of DVDs behind the video monitor 20. By mounting the DVD player 22 in this way, a stable structure is developed that is well adapted for the automobile environment.

Figure 5:
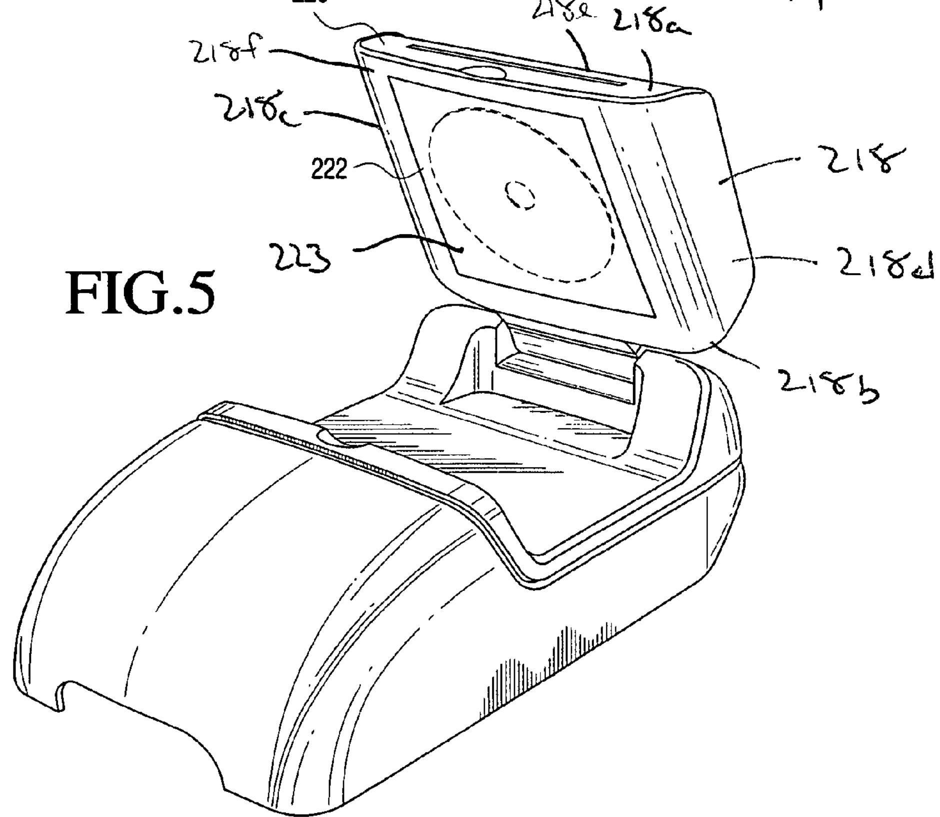
FIG. 5 is an alternate embodiment of the present automobile entertainment system.

While the DVD player is disclosed as being a slot-loaded design with insertion behind the video monitor, the DVD player could take a variety of other forms while still being integrated with the video monitor. For example, and with reference to FIG. 5, the DVD player 222 may be integrated with the backside, or rear surface, 218*e* of the video monitor housing 218 that includes a top 218*a*, bottom 218*b*, first and second sides 218*c*, 218*d*, front surface 218*e* and rear surface 218*f*. DVDs are snapped into DVD player 222, allowing for insertion of DVDs behind the video monitor 220 when the video monitor housing 218 is in an open position. The DVD player 222 is further provided with a pivotalled mounted cover 223 for selective access to the DVDs. The slot-loaded design may also be varied to allow for slot-loading on either the right or left side of the video system. In addition, the DVD player may be designed with a built in TV tuner for providing the user with a choice of video sources.

Control of the video system 14, including the video monitor 20, DVD player 22 and other components of the video system 14, is facilitated by the provision of control buttons 40 along the outer surface of the video system 14. In accordance with a preferred embodiment of the present invention, the control buttons 40 take the form of a multifunction controller permitting movement of a cursor shown upon various interfaces displayed upon the video monitor. In addition, conventional control buttons may also be provided for control of traditional functions.

In addition to the provision of manual control buttons, the video system may further include a remote control (not shown) such that an individual need not actually touch the video system to control the video content or the volume generated by the video system. Once again, and as those skilled in the art will certainly appreciate, a variety of remote control systems may be utilized without departing from the spirit of the present invention.

As briefly discussed above, the video system 14 is detachably secured to the armrest module 16. In particular, the housing 18, including the video monitor 16, DVD player 22 and other related components, is detachably mounted to the cradle 50 for selective placement within the recess 30 of the armrest module 16. As such, the video system 14 may be removed from the automobile and used at a variety of locations apart from the automobile.

As will be discussed below in greater detail, the video system 14 may be used alone or in conjunction with a docking station 74', 74", 74". Once removed, the video system may 14 be used in other automobiles or within an individual's home. When used alone, a battery pack may be connected to the video system and the video system can thereby become a portable entertainment system.

As discussed above, a cradle 50 shaped and dimensioned for receiving the video system 14 is provided within the recess 30 of the armrest module 16. As will be discussed below in greater detail, similar cradles 50', 50", 50'" may be provided at other locations permitting use of the video system at other remote locations. It is contemplated that such a cradle 50, 50', 50", 50'" would be much like the docking stations utilized with laptop computers wherein individuals are permitted to readily remove the laptop from a docking station for use at another location remote from the docking station.

More specifically, the cradle 50 utilized in the armrest module 16 includes quick release electrical connections 52 for the audio input 52*a*, audio output 52*b*, video input 52*c*, video output 52*d* and power supply 52*e* (although one embodiment contemplates a system which connects only to a power supply). The video system 14 similarly includes mating electrical connections 54 for transmitting electricity and a/v signals between the cradle 50 and the video system 14. In particular, when the video system 14 is mounted upon the cradle 50, the respective electrically connections 52, 54 mate to provide for the transmission of power and a/v signals between the video system 14 and the cradle 50. As those skilled in the art will certainly appreciate, other readily removable electrical connections for other purposes may also be supplied if one determines they are so needed.

In addition to the electrical connections 52 provided on the cradle 50, the cradle 50 also includes a connecting mechanism 56 designed for selectively retaining the video system 14 within the cradle 50. The connecting mechanism 56 permits ready and selective attachment of the video system 14 to the armrest module 16 while preventing vibrations and other damaging movements that commonly occur in an automobile.

In accordance with a preferred embodiment of the present invention, the connecting mechanism 56 includes a release button 58 and a latch member 60. The release button 58 is actuated to rotate the latch member 60 and permit removal of the video system from the cradle 50. Insertion of the video system 14 within the armrest module 16 is achieved by simply setting the video system 14 within the cradle 50 and applying sufficient force to the video system 14 for overcoming the rotational force of the latch member 60 to force the video system 14 into a secure position. While a particular coupling structure is disclosed in accordance with a preferred embodiment of the present invention, those skilled in the art will appreciate that a variety of selectively releasable coupling structures may be employed without departing from the spirit of the present invention.

The entertainment system 10 further includes cables (not shown) extending through the armrest module 16. These cables ultimately link audio, video and power to the cradle 50 and video system 14. The cradle 50 and video system 14 are electrically connected to the remainder of the automobile via electrical communication lines extending through the armrest 16. For example, and as will be discussed below in substantial detail, a video input 52*a*, video output 52*b*, audio input 52*c*, audio output 52*d* and power source 52*e*, may be respectively connected to the cradle 50 for ultimate connection with the video system 14 via the mating electrical connections 52, 54 of the respective cradle 50 and video system 14.

Specific wiring arrangements and linking of various video systems within an automobile in accordance with preferred embodiments of the present invention are disclosed in U.S. patent application Ser. No. 10/920,425, entitled "AUTOMOBILE ENTERTAINMENT SYSTEM", filed Aug. 18, 2004, which is incorporated herein by reference, U.S. patent application Ser. No. 10/895,111, entitled "AUTOMOBILE ENTERTAINMENT SYSTEM", filed Jul. 21, 2004, which is incorporated herein by reference, U.S. patent application Ser. No. 10/895,110, entitled "AUTOMOBILE ENTERTAINMENT SYSTEM LINKING MULTIPLE VIDEO SYSTEM FOR COORDINATED SHARING OF VIDEO CONTENT", filed Jul. 21, 2004, which is incorporated herein by reference, U.S. patent application Ser. No. 10/895,086, entitled "HOUSING FOR AN AUTOMOBILE ENTERTAINMENT SYSTEM", filed Jul. 21, 2004, which is incorporated herein by reference, U.S. patent application Ser. No. 10/895,099, entitled "INSTALLATION APPARATUS FOR AN AUTOMOBILE ENTERTAINMENT SYSTEM", filed Jul. 21, 2004, which is incorporated herein by reference, U.S. patent application Ser. No. 10/920,431, entitled "AUTOMOBILE ENTERTAINMENT SYSTEM", filed Aug. 18, 2004, which is incorporated herein by reference, and U.S. patent application Ser. No. 10/920,430, entitled "AUTOMOBILE ENTERTAINMENT SYSTEM", filed Aug. 18, 2004, which is incorporated herein by reference.

In addition to contemplated hardwiring of the present video system within an automobile, the system may be design for quick installation by a vehicle owner. With this in mind, and as those skilled in the art will certainly appreciate the present video system may be designed for simply plugging it into a power source (for example, a cigarette lighter) commonly found in vehicles. In accordance with such and embodiment, the video system would be provided with a pass through for access to wires linking the video system to a power source and/or external speakers.

The present video system 14 is provided with the ability to offer a variety of functionalities. These functionalities may be hardwired or programmed within the video system 14 or the functionalities may be added in a modular manner via an expansion slot 67 provided within the video system 14. Contemplated functionalities include, but are not limited to satellite radio (for example, Serius, XM), Pictel phone satellite television (for example, DirecTV), GPS guidance systems, quick release battery packs, memory cards, wireless internet access (for example, Wi-Fi), Bluetooth, digital video recorders, digital video reception and recording, digital video inputs, video conferencing, cellular digital, cellular digital with a camera, USB capabilities, Blue sphere, hot swap hard drive, satellite video import card, wireless video import card, etc. Additional details regarding the implementation of such features are found in commonly owned U.S. patent application Ser. No. 11/153,364, entitled "VEHICLE ENTERTAINMENT SYSTEM INCLUDING A DETACHABLE FUNCTIONAL MODULE HOUSED WITHIN A DETACHABLE VIDEO SYSTEM", filed Jun. 16, 2005, which is incorporated herein by reference.

Enhanced usage is further provided by the inclusion of RCA ports 64, or other a/v input/outputs, formed within the cradle 50 and contained behind a cover 66 which may be selectively opened to reveal the ports 64. The inclusion of these ports 64 allows for ready attachment of the present video system 14 to other remote a/v sources (for example, game consoles, portable digital music players, etc.). The video system may also be provided with a flashlight 65 controlled by an on/off switch 65*a*, which runs off a battery (not shown) mounted within the video system 14. The video system 14 may further be provided with both a 110 A outlet 67*a* and a 12 V outlet 67*b* for connection with other electronic devices requiring power.

In addition, and in accordance with a preferred embodiment, a broadcast television receiver 68 is integrated with the video monitor 20 and/or the armrest module 16. More particularly, and with reference to FIG. 2, the housing 18 is provided with a rear recess 70 shaped and dimensioned for receiving a television receiver 68. The television receiver 68 may, therefore, be wired for use in conjunction with the video monitor 20 in a manner known to those skilled in the art.

The television receiver 68 is further provided with a retractable antenna 72. The antenna 72 is electrically connected to the television receiver 68 for the transmission of over-the-air signals. In addition, and as those skilled in the art will certainly appreciate, the antenna may be wired or wirelessly connected to the television receiver, and take a variety of forms, without departing from the spirit of the present invention.

As mentioned above, the present video system 14 is adapted for removal from the armrest module 16 for use at a variety of other locations. In accordance with a preferred embodiment of the present invention, the other locations are provide with a docking station 74', 74", 74'" including auxiliary cradles 50', 50", 50'" shaped and dimensioned for receiving and retaining the video system 14 and coupling the video system 14 to power sources and a/v sources in a manner similar to the cradle 50 used in conjunction with the armrest module.

For example, and with reference to FIG. 6, a docking station 74' for use in conjunction with the dash 75 of a conventional automobile is shown. The docking station 74' includes an auxiliary cradle 50' (with electrical connections and a connecting mechanism (not shown)) shaped and dimensioned for receiving and securely holding the video system 14 and coupling the video system 14 to power sources and a/v sources in a manner similar to the cradle 50 used in conjunction with the armrest module 16. The docking station 74' is mounted upon the dash of an automobile and is wired for connection to a power source and a/v sources (not shown). In addition, the dash docking station 74' may include an integrated satellite receiver 76 for providing satellite content to the passenger of the automobile by transmitting the satellite signal through the cradle 50' and into the video system 14 via the respective electrical connections 52', 54 of the cradle 50' and the video system 14.

This embodiment is particularly useful where the video system 14 includes functionality relating to the provision of GPS guidance information. With this in mind, the driver will be able to selectively use the video system for accessing guidance information when needed and return the video system 14 to the armrest module 16 when guidance information is no longer needed.

With reference to FIG. 7, a mobile docking station 74" may also be provided. The mobile docking station 74" also includes an auxiliary cradle 50" (with electrical connections 52" and a connecting mechanism (not shown)) shaped and dimensioned for receiving and securely holding the video system 14 and coupling the video system 14 to power sources and a/v sources in a manner similar to the cradle 50 used in conjunction with the armrest module. The docking station 74" may include a battery pack 78", a/v inputs 80", a/v outputs 82", Internet capability 84", speakers 86", cable input 88" and/or an integrated satellite receiver 90". These components are linked to the video system 14 via the cradle 50" which transmits the relevant signals to and from the video system 14 via the respective electrical connections of the cradle 50" and the video system 14.

With reference to FIG. 8, yet a further embodiment of a docking station 74'" is disclosed. This docking station 74'" is adapted for static mounting within a household, office or other locations (for example, beneath a kitchen cabinet). The docking station 74'" includes an auxiliary cradle 50'" (with electrical connections and a connecting mechanism (not shown)) shaped and dimensioned for receiving and securely holding the video system 14 and coupling the video system 14 to power sources and a/v sources in a manner similar to the cradle 50 used in conjunction with the armrest module. The docking station 74'" may include a battery pack 78", a/v inputs 80', a/v outputs 82'", Internet capability 84'", speakers 86'", cable input 88'" and/or an integrated satellite receiver 90'". These components are linked to the video system 14 via the cradle 50'" which transmits the relevant signals to and from the video system 14 via the respective electrical connections of the cradle 50'" and the video system 14.

As shown in FIG. 8, when the video system 14 is mounted beneath a kitchen cabinet 92 as shown, it may be necessary to mount the video system 14 upside down when compared to its mounting within an automobile armrest module 16. With this in mind, the video system 14 is provided with the ability to rotate to the image shown on the video monitor so that the video system 14 may be used in a variety of orientation. The possible rotation of the image shown on the video monitor 14 is complimented by the multifunctional controller 40 that adjusts to rotation of the image such that the controller is calibrated to function in accordance with the orientation of the screen image.

While the preferred embodiments have been shown and described, it will be understood that there is no intent to limit the invention by such disclosure, but rather, is intended to cover all modifications and alternate constructions falling within the spirit and scope of the invention as defined in the appended claims.

The invention claimed is:

1. A vehicle entertainment system, comprising:

a video system detachably mounted within an automobile armrest/console, the armrest/console including an upper support surface composed of an armrest module and the video system is detachably secured to the armrest module, the armrest module includes a hinge structure that is pivotally coupled to the automobile armrest/console;

the armrest module further includes a cradle to which a base of the video system is pivotally mounted in a manner that permits rotation of the video system about multiple axes, and the cradle includes a first hinge that facilitates rotation of the video system from a storage position in the armrest module to an upstanding position for viewing thereof, a second hinge that permits rotation of the video system about an axis substantially perpendicular to an axis of the first hinge, and an upper portion including electrical connectors shaped and dimensioned for selective engagement with electrical connectors formed on the video system and a connecting mechanism for selective attachment of the video system to the cradle, wherein the second hinge is stacked on the first hinge, and the upper portion is stacked on the second hinge; and the video system including an integrated housing supporting a video monitor and a video source, wherein the armrest module includes a recess shaped and dimensioned for receiving the housing of the video system such that a back of the housing faces upwardly from the automobile armrest/console and forms part of the upper support surface when the video system is in the storage position.

2. The entertainment system according to claim 1, wherein the video source is a DVD player or hard drive.

3. The entertainment system according to claim 1, wherein the video source is accessed from behind the video monitor.

4. The entertainment system according to claim 1, wherein the armrest module is selectively removeable from the armrest/console.

5. The entertainment system according to claim 1, wherein the connecting mechanism includes a release button for selective release of the video system from the cradle.

6. The entertainment system according to claim 5, wherein the connecting mechanism includes a latch member for selective coupling of the video system to the cradle.

7. The entertainment system according to claim 1, further including at least one docking station to which the video system may be selectively secured when not coupled to the armrest/console.

8. An armrest/console incorporating vehicle entertainment system, comprising:

an upper support surface with a video system detachably mounted therein, the upper support surface composed of an armrest module and the video system is detachably secured to the armrest module, the armrest module includes a hinge structure that is pivotally coupled to the automobile armrest/console;

the armrest module further includes a cradle to which a base of the video system is pivotally mounted in a manner that permits rotation of the video system about multiple axes, and the cradle includes a first hinge that facilitates rotation of the video system from a storage position in the armrest module to an upstanding position for viewing thereof, a second hinge that permits rotation of the video system about an axis substantially perpendicular to an axis of the first hinge, and an upper portion including electrical connectors shaped and dimensioned for selective engagement with electrical connectors formed on the video system and a connecting mechanism for selective attachment of the video system to the cradle, wherein the second hinge is stacked on the first hinge, and the upper portion is stacked on the second hinge; and the video system including an integrated housing supporting a video monitor and a video source, wherein the armrest module includes a recess shaped and dimensioned for receiving the housing of the video system such that a back of the housing faces upwardly from the automobile armrest/console and forms part of the upper support surface when the video system is in the storage position.

9. The armrest/console according to claim 8, wherein the video source is a DVD player or hard drive.

10. The armrest/console according to claim 8, wherein the armrest module is selectively removeable from the armrest/console.

11. The entertainment system according to claim 8, wherein the connecting mechanism includes a release button for selective release of the video system from the cradle.

12. The entertainment system according to claim 11, wherein the connecting mechanism includes a latch member for selective coupling of the video system to the cradle.

13. The entertainment system according to claim 8, further including at least one docking station to which the video system may be selectively secured when not coupled to the armrest/console.

* * * * *